US011875573B2

(12) United States Patent
Toca et al.

(10) Patent No.: US 11,875,573 B2
(45) Date of Patent: Jan. 16, 2024

(54) IMAGE PROCESSING SYSTEM

(71) Applicant: FotoNation Limited, Galway (IE)

(72) Inventors: Cosmin Toca, Bucharest (RO); Bogdan Sandoi, Bucharest (RO); Petronel Bigioi, Galway (IE)

(73) Assignee: FotoNation Limited

( * ) Notice: Subject to any disclaimer, the term of this patent is extended or adjusted under 35 U.S.C. 154(b) by 66 days.

(21) Appl. No.: 17/243,423

(22) Filed: Apr. 28, 2021

(65) Prior Publication Data
US 2021/0343029 A1    Nov. 4, 2021

Related U.S. Application Data

(60) Provisional application No. 63/017,165, filed on Apr. 29, 2020.

(51) Int. Cl.
*G06V 20/56* (2022.01)
*G06T 7/292* (2017.01)
(Continued)

(52) U.S. Cl.
CPC .............. *G06V 20/56* (2022.01); *G06F 18/21* (2023.01); *G06F 18/24* (2023.01); *G06F 18/25* (2023.01);
(Continued)

(58) Field of Classification Search
CPC ........... G06T 7/74; G06T 7/248; G06T 7/292; G06V 20/52; G06V 10/98; G06K 9/6217;
(Continued)

(56) References Cited

U.S. PATENT DOCUMENTS

| 5,724,475 A | * | 3/1998 | Kirsten | ................ | H04N 19/137 |
| | | | | | 348/E7.086 |
| 6,011,901 A | * | 1/2000 | Kirsten | .................. | H04N 7/181 |
| | | | | | 348/E7.086 |

(Continued)

FOREIGN PATENT DOCUMENTS

| EP | 3582176 A1 | 10/2020 |
| WO | 2017/032468 A1 | 3/2017 |
| WO | 2019/042703 A1 | 8/2017 |

OTHER PUBLICATIONS

Mandali M., Kumar L.K, Saran M.S. and Vipparthi S.K., "MotionRec: A Unified Deep Framework for Moving Object Recognition", WACV-2020.

(Continued)

*Primary Examiner* — Christopher S Kelley
*Assistant Examiner* — Asmamaw G Tarko
(74) *Attorney, Agent, or Firm* — Lerner David LLP

(57) ABSTRACT

An image processing system is configured to receive a first high resolution stream of images and a second lower resolution stream of images from image sources with substantially the same field of view. The system comprises a localizer component configured to provide a location for any object of interest independently of class within successive images of the second stream of images; a classifier configured to: receive one or more locations selectively provided by the localizer, identify a corresponding portion of an image acquired from the first stream at substantially the same time at which an image from the second stream in which an object of interest was identified and return a classification for the type of object within the identified portion of the image from the first stream; and a tracker (Continued)

configured to associate the classification with the location through acquisition of successive images in the second stream.

16 Claims, 4 Drawing Sheets

(51) Int. Cl.
| | |
|---|---|
| *G06T 7/73* | (2017.01) |
| *G06T 7/246* | (2017.01) |
| *G06N 3/04* | (2023.01) |
| *H04N 7/18* | (2006.01) |
| *G06V 20/52* | (2022.01) |
| *G06F 18/21* | (2023.01) |
| *G06F 18/24* | (2023.01) |
| *G06F 18/25* | (2023.01) |
| *G06V 10/44* | (2022.01) |

(52) U.S. Cl.
CPC ............... *G06N 3/04* (2013.01); *G06T 7/248* (2017.01); *G06T 7/292* (2017.01); *G06T 7/74* (2017.01); *G06V 10/454* (2022.01); *G06V 20/52* (2022.01); *H04N 7/181* (2013.01); *G06T 2207/10016* (2013.01); *G06T 2207/10028* (2013.01); *G06T 2207/10048* (2013.01); *G06T 2207/10132* (2013.01); *G06T 2207/20084* (2013.01); *G06T 2207/30232* (2013.01)

(58) Field of Classification Search
CPC ...... G06K 9/6267; G06K 9/6288; G06N 3/04; H04N 7/181
USPC .......................................................... 348/159
See application file for complete search history.

(56) References Cited

U.S. PATENT DOCUMENTS

| | | | |
|---|---|---|---|
| 10,699,421 B1* | 6/2020 | Cherevatsky | G06V 20/52 |
| 2013/0182902 A1* | 7/2013 | Holz | G06T 7/593 |
| | | | 382/103 |
| 2013/0222564 A1* | 8/2013 | Park | G06V 10/141 |
| | | | 348/77 |
| 2017/0061639 A1* | 3/2017 | Georgescu | G06T 7/73 |
| 2018/0307921 A1* | 10/2018 | Vallespi-Gonzalez | |
| | | | G01S 17/931 |
| 2019/0034734 A1* | 1/2019 | Yen | G06T 7/246 |
| 2019/0065410 A1* | 2/2019 | Bigioi | G06F 9/44505 |
| 2019/0130164 A1* | 5/2019 | Georgescu | G06T 7/11 |
| 2020/0143510 A1* | 5/2020 | Nicula | G06T 3/4007 |

OTHER PUBLICATIONS

Zhou Y. and Maskelli S., "Detecting and Tracking Small Moving Objects in Wide Area Motion Imagery (WAMI) Using Convolutional Neural Networks (CNNs)", accepted for publication in 22nd International Conference on Information Fusion (FUSION 2019), arXiv: 1911.01727v2 [cs.CV] Nov. 8, 2019.

Yu R., Wang H. and Davis L.S., "ReMotENet: Efficient Relevant Motion Event Detection for Large-scale Home Surveillance Videos", arXiv:1801.02031v1, WACV-2018.

Liu M. and Zhu M., "Mobile Video Object Detection with Temporally-Aware Feature Maps", in CVPR 2018, arXiv:1711.06368v2 [cs.CV] Mar. 28, 2018.

Liu M., Zhu M., White M., Li Y. and Kalenichenko D., "Looking Fast and Slow: Memory-Guided Mobile Video Object Detection", arXiv:1903.10172v1.

Stec, Piotr, U.S. Appl. No. 16/674,378, filed Nov. 5, 2019 and entitled "Event-Sensor Camera."

www.jeremyjordan.me/object-detection-one-stage/.

\* cited by examiner

|     |    |    |    |    |
|-----|----|----|----|----|
| N-4 | 66 | 66 | 66 | 66 |
| N-3 | 74 | 74 | 74 | 74 |
| N-2 | 82 | 82 | 82 | 82 |
| N-1 | 86 | 86 | 86 | 86 |
| N   | 87 | 88 | 89 | 90 |

IMAGE PROCESSING SYSTEM

CROSS-REFERENCE TO RELATED APPLICATIONS

This application claims the benefit of U.S. Provisional Patent Application No. 63/017,165 filed Apr. 29, 2020 which is incorporated by reference herein in its entirety.

FIELD

The present invention relates to an image processing system.

BACKGROUND

A classic problem in object detection when processing an image is that, as objects increase in distance from an image acquisition device, they appear smaller in image area in accordance 1/distance$^2$ and so the resources required for detecting such objects increases as an order O(distance$^2$). Furthermore, as the number of different types of objects which are to be identified increases, the resources required to apply a respective classifier for each type of object of a given size increase proportionally.

Many different approaches have been taken to rationalize this process:

Mandal M., Kumar L. K, Saran M. S. and Vipparthi S. K., "MotionRec: A Unified Deep Framework for Moving Object Recognition", WACV-2020 explicitly determines a background from a number of previous frames and based on a hi resolution image performs object classification. The architecture will only provide output for objects corresponding to one of a number of pre-trained classes.

Zhou Y. and Maskell S., "Detecting and Tracking Small Moving Objects in Wide Area Motion Imagery (WAMI) Using Convolutional Neural Networks (CNNs)", accepted for publication in 22nd International Conference on Information Fusion (FUSION 2019), arXiv: 1911.01727v2 [cs.CV] 8 Nov. 2019 is only concerned with detecting the presence of moving objects, rather than object classification.

Yu R., Wang H. and Davis L. S., "ReMotENet: Efficient Relevant Motion Event Detection for Large-scale Home Surveillance Videos", arXiv:1801.02031v1, WACV-2018 involves a spatio-temporal 3-D convolution for moving object classification, however, this is an extremely processor intensive approach.

Liu M. and Zhu M., "Mobile Video Object Detection with Temporally-Aware Feature Maps", in CVPR 2018, arXiv: 1711.06368v2 combines fast single-image object detection with convolutional long short term memory (LSTM) layers to create an interweaved recurrent-convolutional architecture. However, this approach is limited by the resolution chosen for the input images and again is limited to detecting movement for pre-trained object types.

Similarly, the approach disclosed in Liu M., Zhu M., White M., Li Y. and Kalenichenko D.,"Looking Fast and Slow: Memory-Guided Mobile Video Object Detection", arXiv:1903.10172v1 is limited by the resolution chosen for the input images and again is limited to detecting movement for pre-trained object types.

SUMMARY

According to the present invention there is provided an image processing system as claimed in claim 1.

Embodiments comprise two main components each being fed from a separate image source. A first localizer, preferably comprising a neural network, localizes objects (independently of class) based on information from a first low resolution image source; and a second classifier analyses object locations provided by the localizer in a separate higher resolution image.

By tracking objects located in successive low resolution images, the classifier need only applied be once to newly identified object locations. In addition or in the alternative, the classifier can be applied only to objects which have been identified as having stopped moving within the field of view.

Embodiments of the present invention can provide real time inference of the presence of moving objects of a known or unknown type with a relatively small and/or fast network.

Embodiments can localize far-away objects with few feature points, but work at higher resolution when attempting to classify objects.

In some embodiments, the types of object which are to be classified may vary from time to time independently of the localization mechanism used.

In some embodiments, the low resolution image source comprises a sub-sampled version of the higher resolution image provided from a common camera; whereas in other embodiments the low resolution image source comprises a distinct image source separate from the higher resolution image source. For example, the low resolution image source could comprise a thermal infra-red camera with the localizer being configured to detect the presence of living objects. In such cases, the high resolution image source could comprise a visible wavelength camera with a field of view substantially overlapping the field of view of the thermal infra-red camera.

In some cases, the localizer can be configured to respond to the presence of foreground objects, for example, warm bodies against a cold background; whereas in other embodiments the localizer can be configured to localize moving objects.

While a combination of thermal infra-red camera and visible camera might require distinct separate image sources, other applications might be based on combination of high resolution visible and lower resolution near infra-red imagery. In this case, both image sources could be integrated into a single camera with an RBG-IR color filter array (CFA) type image sensor.

Still further implementations could involve low resolution sensors building images of a scene based on non-optical sensors such as LIDAR or ultrasound.

Embodiments find particular utility in processing images produced by static security cameras of the type now typically employed for home surveillance and can be implemented with chipsets of the type produced by Perceive Corporation of San Jose, United States.

Embodiments which are initially concerned with localizing moving objects can be configured with adaptive non-uniform time sampling to localize both fast and slow-moving objects.

In such embodiments, an early determination of the lack of presence of any object movement can be made to avoid needing to attempt to completely execute movement localization on an image frame.

In some embodiments, image frames are divided into regions of interest to localize potential movement per region before then conducting relatively higher resolution localization in only regions in which potential motion is detected.

Implementations of the localizer do not need to be trained to learn specific object spatial features, but only need to be trained to identify temporal movement and based on coarse generic object spatial features.

In embodiments based on localizing moving objects, computations from previous frames can be reused to increase speed.

Once provided with a location within its field of view for an object, the classifier can produce confident results even for relatively long-range objects. So, for example, for a typical security camera with a 140° field of view and a 320×240 pixel low resolution image source, it is possible to localize a potential face occupying as few as 2×2 pixels when as far away as approximately 10 meters or a person at 25 meters. The classifier can then run on the corresponding high resolution version of the image to produce a more confident result that a face or a person has appeared within the field of view of the high resolution image source.

It will be appreciated that even when the classifier fails to classify an object at a given location, it can still be understood that an unknown object has been detected and this can continue to be tracked by the localizer. Then if for example the size of the detected object increases or a confidence value for the object provided by the localizer increases, the classifier might be run again.

It will be appreciated that as the classifier is implemented independently of the localizer, it is much more readily extended or re-directed to other object classes, without need for retraining for all the environment which may be under surveillance by the camera.

BRIEF DESCRIPTION OF THE DRAWINGS

An embodiment of the invention will now be described, by way of example, with reference to the accompanying drawings, in which:

FIG. 4 illustrates elastic sampling of the low resolution image source with the system of FIG. 1.

DESCRIPTION OF THE EMBODIMENT

Figure 1:
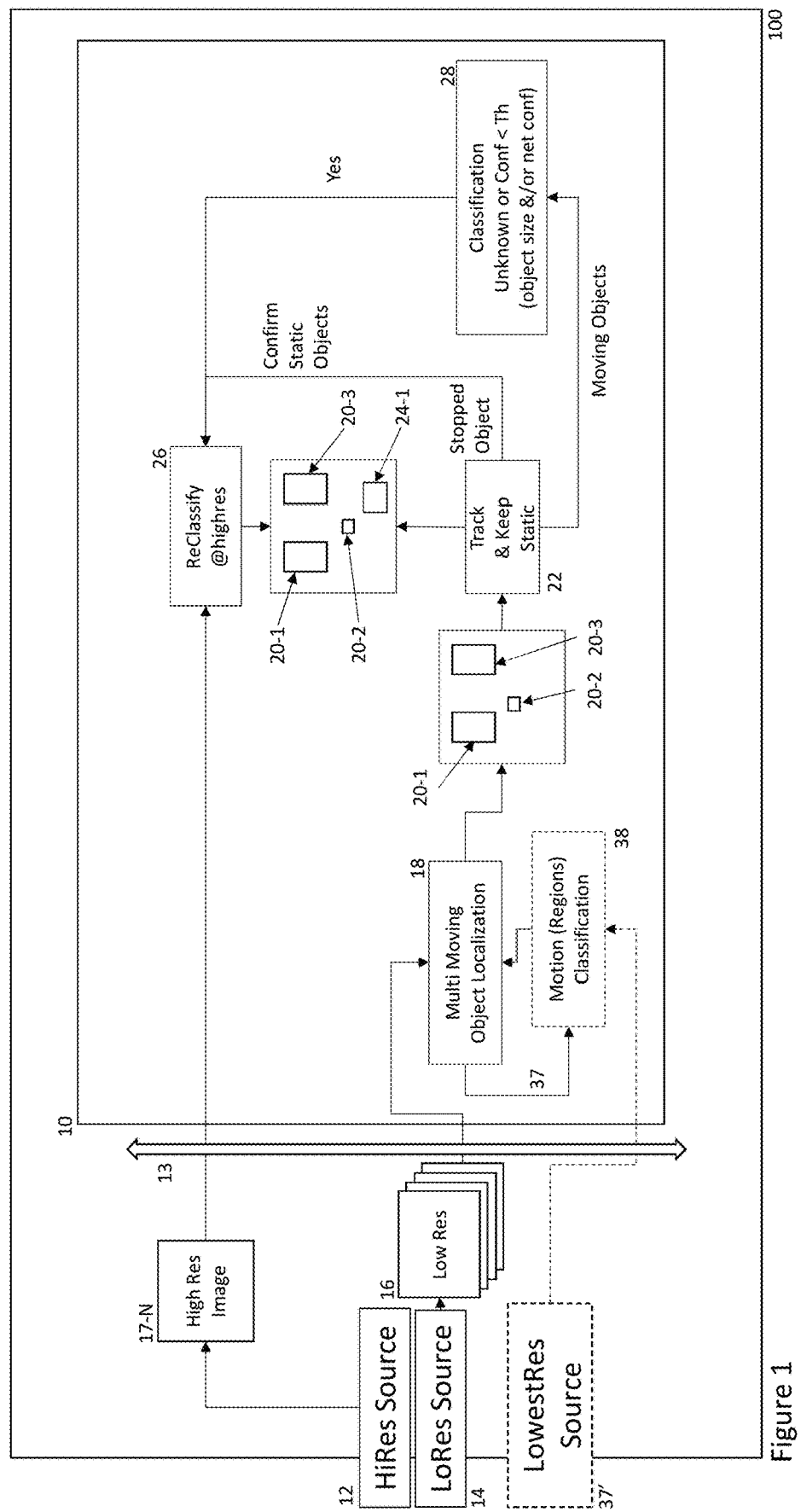
FIG. 1 shows a camera including an image processing system according to an embodiment of the present invention.

Referring now to FIG. 1, there is shown schematically, a camera 100 including an image processing system 10 according to an embodiment of the present invention. The image processing system 10 is operably connected to a high resolution image source 12, typically a visible wavelength camera, and a lower resolution image source 14 whose field of view substantially overlaps the field of view of the high resolution image source 12.

In a typical application, each image source 12, 14 comprises a static wide field of view camera, typically with a viewing angle greater than about 90°, preferably greater than about 120° and more preferably greater than around 140° or more, mounted for continuous surveillance of an environment.

Such cameras can be integrated within the housing for the camera 100 in a form factor suitable for operating as a wall mounted security camera or a smart video doorbell of the type available from Ring Inc., Google LLC under the brand Nest™, Arlo Technologies etc.

The image processing system 10 can be implemented in a dedicated chip or chip set configured to receive and process streams of images provided by each of the image sources 12, 14 from across a local bus 13 within the camera 100.

While only the image sources 12, 14 and image processing system 10 are shown in FIG. 1, it will be appreciated that the camera 100 may include other components, some of which can be connected to the bus 13, including a central general purpose processor, system memory and non-volatile storage.

As will be described, much of the processing performed by the image processing system 10 may involve processing layers of a neural network and so the image processing system 10 may be implemented on a platform along the lines of the peripheral processing devices described in PCT Application WO2019/042703 (Ref: FN-618-PCT). Alternatively, chipsets such as those available from Perceive Corporation of San Jose, United States may be adapted to implement certain embodiments of the invention.

In these cases, the image processing system 10 may be integrated (or even retrofitted when incorporated within an SD-card) locally with the image sources 12, 14 so maintaining the compact form factor typical of such surveillance cameras.

Nonetheless, it will be appreciated that in other embodiments, the image processing system 10 may not be immediately local to the image sources 12, 14 and they may communicate across any combination of a wired or wireless local or wide area network, using any combination of either circuit switched or packet switched communication.

In one embodiment, the lower resolution image source 14 comprises a sub-sampled version of images produced by the high resolution image source 12. However, in other embodiments, the lower resolution image source 14 comprises a distinct separate image source, for example, a thermal infra-red camera. In still other embodiments, different forms of sensor may be used to produce a low resolution image including LIDAR or ultrasonic sensors.

In still further embodiments, higher and lower resolution images could be drawn from a common image sensor, for example, a color filter array (CFA) sensor comprising RGB-IR pixels, with the visible wavelength sub-pixel information being provided as a higher resolution image and the IR sub-pixel information being provided as a lower resolution image.

In some cases, the raw RGB image information acquired from an image sensor can be transformed into an intensity/chromaticity image space such as LAB, YCC or YUV space. In this case, the low resolution image might simply comprise the intensity image information or a sub-sampled version of such information.

In still further variations, the low resolution image source 14 might comprise an event camera of the type described in U.S. application Ser. No. 16/674,378 filed 5 Nov. 2019 and entitled "Event-Sensor Camera" (Ref: FN-654-US). Whether using such dedicated hardware or equivalent software, such an image source could provide a delta image where moving objects from within a field of view can be more readily identified.

In any case, a stream of lower resolution images 16 provided by the image source 14 are provided to a localizer component 18 of the image processing system 10 with a view to identifying objects of interest within the field of view of the image source 14.

In a simple embodiment, for example, when the image source 14 comprises a thermal camera, the localizer 18 can be configured to identify the location of any discrete warm bodies against a cooler background. This may be based on analysis of a current image alone, but more typically, information acquired from previous images can be used to improve the location of objects within any given image. In any case, any identified location can comprise an x,y location and size of a rectangular area of the image bounding the object of interest.

In other embodiments, such as shown in FIG. 1, the localizer 18 can be more specifically configured to identify objects which are moving within the field of view of the image source 14 and more details will be provided below in relation to exemplary mechanisms for doing so.

It should be appreciated that when attempting to identify objects which may appear at a range of sizes in accordance with their distance from the camera 14, it can be useful to employ heuristics to avoid needing to search an entire image for the object at a given size.

So, for example, prior to or as part of the localizer 18, a horizon line detector (not shown) can be applied to determine a horizon line within the field of view of the camera 14 (and also the camera 12). (This may only need to be done once for a static camera or only in response to pan, tilt or zoom of a PTZ camera.) Once the horizon line is known, it is expected that objects such as people or parcels will tend to be smaller when they appear in images at or above the horizon and will tend to be larger when they appear in images at or below the horizon. As such, the localizer 18 can be configured only to look for regions below a given size at or above the horizon line portion of images 16 produced by the camera 14, and for regions above a given size at or below the horizon line portion of images 16.

In any case, the localizer 18 will produce a set of zero or more locations 20-1, 20-2, 20-3 for any objects detected as moving within the field of view of image source 14. Again, each location can comprise an x,y location and size of a rectangular area of the image bounding the object of interest.

In the example shown, locations provided by the localizer 18 are rectangular and oriented normally with respect to the image frame. However, it will be appreciated that in variants of the embodiment, non-rectangular objects at rotated angles may be detected. In such an embodiment, the localizer might identify a location by providing the location of 3 or more vertices of a region bounding a detected object.

In the example shown, the localizer 18 provides any locations 20 identified by the localizer 18 to a tracker 22. The tracker 22 can determine if a moving object location corresponds with a previously detected location of a moving object, for example, by deciding if an identified location in a current image corresponds or overlaps sufficiently with an expected trajectory of an object detected in on or more previous images. If so the tracker 22 can update the location and/or size of the moving object.

Knowing the location of objects which were detected as having been moving in previous low resolution images of the stream 16, the tracker 22 can also identify that an object which had been identified as moving is no longer moving e.g. no moving object has been detected in a location overlapping or close to a location in which an object had been detected in a recent low resolution image frame. (This need not be an immediately recent frame as will be explained below.) In the example, of FIG. 1, such an object location is identified as location 24-1.

On the other hand, if an object is identified within the field of view where no object had been expected or detected previously, such an object is treated as being new.

In the embodiment illustrated in FIG. 1, for a newly detected moving object such as any of objects 20-1 . . . 20-3 when they were first localized, a decision 28 can be made before deciding if such objects are to be subjected to classification. In the embodiment, this decision is based on a detected object being above a given size and/or or a detection confidence for the object being above a given threshold (where such information is provided either by the localizer 18).

In some embodiments of the invention, it may be desirable to attempt to classify moving objects in a location as small as 2×2 pixels within the low resolution image. While this may correspond with a much greater sized corresponding region within the high resolution image, there may still be a requirement for such locations to be more clearly likely to be moving than for example, a larger location. As such, combining confidence and size can be a useful filter for locations which are to be provided to a classifier component 26 for subsequent classification.

Separately, in this embodiment, the tracker 22 also requests the classifier component 26 to attempt to classify a location at which a tracked object, such as object 24-1, has stopped. This can enable the system to tell if the object has really stopped moving or has actually disappeared, for example, by leaving through a door, from the field of view.

In general, the classifier 26 receives one or more locations identified and tracked within the low resolution image stream 16 and identifies corresponding location(s) within a high resolution image 17-N acquired at the same time or substantially the same time as the last analysed low resolution image 16-N. Clearly, locations within the high resolution image will contain much more information than available from within the low resolution image and so will range from as little as 4×4 pixels (where the smallest location detected by the localizer 18 is 2×2 pixels and the high resolution image is at twice the resolution of the low resolution image) to much larger.

The classifier 26 may comprise any suitable form for classifier and may be neural network based or may comprise a more classical form of Haar based classifier.

In any case, as described in PCT Application WO2017/032468 (Ref: FN-469-PCT) and European Patent Application 3582176 (Ref: FN-635-EP), it can be useful to provide the classifier 26 with a normalised image region for classification. Thus, the classifier 26 may require a 64×64 image region for classification and so any regions 20-1 . . . 20-3 or 24-1 detected by the localizer 18 and which are required to be classified by the tracker 22 can be converted into such a normalized region using any combination of upsampling, downsampling or image rotation as required.

This step can be performed either by the localizer 18, the tracker 22 or the classifier 26.

Furthermore, additional processing of any given location may be performed for example to determine if a tighter fit of the location around a detected object can be made by regression analysis.

This can be performed before or after normalization and again within any of the localizer 18, the tracker 22 or the classifier 26.

In any case, once a normalised region is available, the classifier 26 can apply as many classifier tests as required to the region to determine if it conforms with any known class. If so, the class along with a confidence level for the classification can be returned to the tracker 22 and associated with the location.

If not, the location can remain as an unknown classified object. In this case, the tracker can wait until either the size of the location corresponding to the unknown classified object increases sufficiently or if the confidence for the location is provided by the localizer 18 and this increases sufficiently in subsequent frames so that a higher threshold is met before re-submitting the location for re-classification.

Where the classifier 26 provides a confidence score for any given location which is subjected to classification, the tracker 22 may re-submit any location for a moving object for classification where a previous classification did not return a sufficiently high confidence score for a classification. So for example, a multi-class classifier might produce classification score for face, person or animal for any given location. If no score were sufficiently high or distinct from other score, this may be regarded as a failure to classify. This may continue for every frame in which a moving object remains unclassified or unsatisfactorily classified. It may be performed periodically on an unclassified object, or the tracker 22 may wait until the size of a location for a given detected object increases sufficiently to merit re-classification.

In any case, a location can be re-classified when the object stops moving.

From FIG. 1, it should be seen that in general, embodiments first localize generic objects at low resolution, typically, moving objects are detected using multiple input image frames, before providing such localized objects to a classifier for recognition as required. It is therefore possible to track both known and unknown types of objects with minimal classification overhead.

Figure 2:
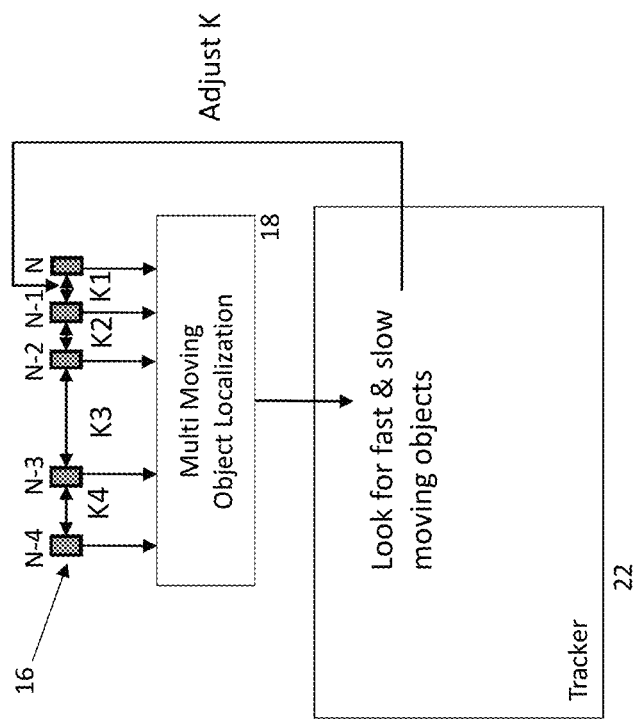
FIG. 2 illustrates uniform and non-uniform sampling of a low resolution image source within the system of FIG. 1.
Figure 2:
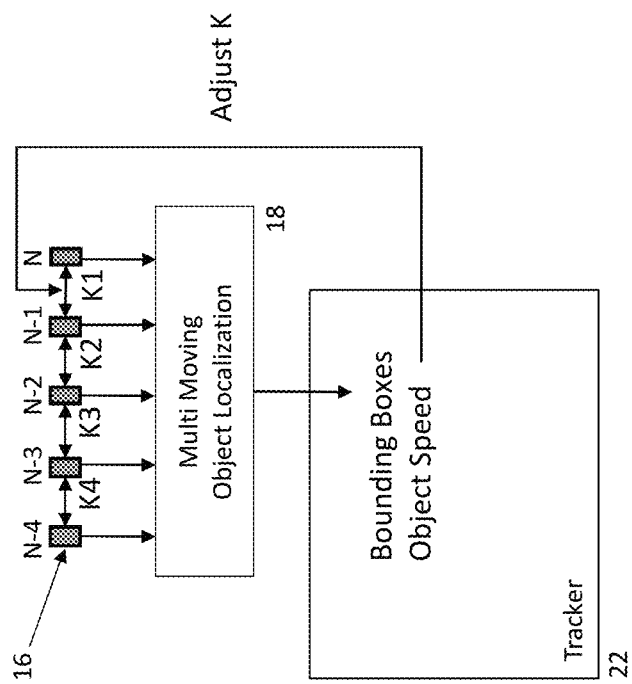

Turning now to FIG. 2, it will be appreciated that it can be desirable to track both fast and slow moving objects appearing within the field of view of low resolution image source 14.

Typically, a limited number of input image frames, in this case 5, are fed to the localizer 18 with a view to detecting such objects. If only a given frame and the N most recent previous frames are chosen as input for the localizer 18, then this will provide the greatest chance of detecting fast moving objects, but potentially miss slower moving objects. On the other hand, if the N previous frames are chosen with too great an interval between frames, then while slow moving objects can be detected, fast moving objects can be missed.

As such, embodiments of the present invention are based on adapting the time span across which input frames are chosen in accordance with a speed at which any detected object is moving within the field of view of the cameras 12, 14.

Thus, in one embodiment, the localizer 18 can begin by choosing a uniform interval between the frames which are to be analysed to localize moving objects within a given image frame N. In the example, 4 previous image frames N-1 . . . N-4 are used in the analysis of frame N and and equal interval K1=K2=K3=K4 is chosen between these with a view to detecting most objects.

Once any moving object is detected, the interval may be increased or decreased in accordance with the speed of the object. So for example, for fast moving objects, the interval might be 4 frames, whereas for slow moving objects the interval might be 8 frames.

Nonetheless, it will be appreciated that at any given instant both one or more fast moving objects as well as one or more slower moving objects may be detected at a given time.

In this case, a non-uniform mix of intervals may be employed with for example, at least one long interval K3 between previous frames N-2 and N-3 being chosen, with shorter intervals such as K4 between the remaining frames.

This can enable the localizer 18 to continue to detect both objects moving both quickly and slowly within the field of view of the cameras 12, 14 over the interval K1+K2+K3+K4.

Figure 3:
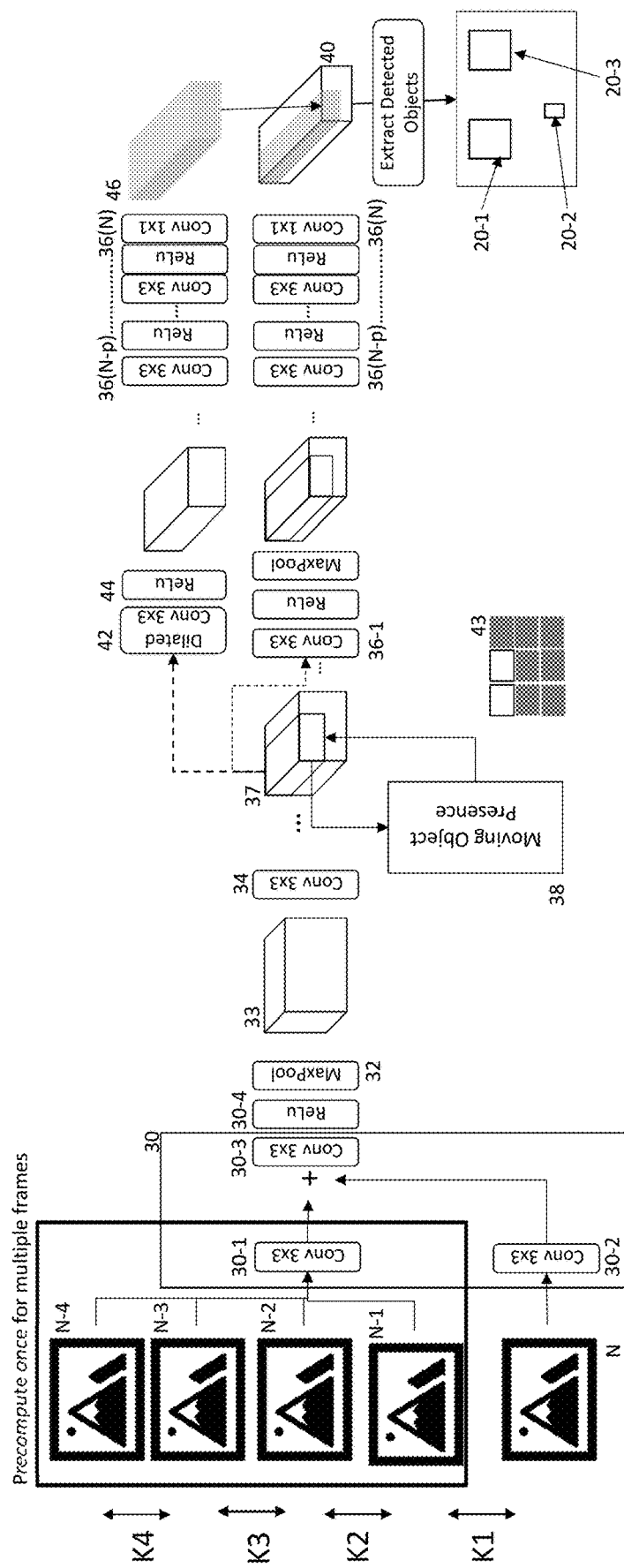
FIG. 3 illustrates the operation of the localizer of FIG. 1 in more detail.

Referring now to FIG. 3, in some embodiments of the present invention, the localizer 18 is based on a convolutional neural network. Such networks typically begin with a convolution 30 of the available inputs, in this example, the 5 frames N . . . N-4 in which moving objects are to be detected. In any case, the number of convolutional operations required by this layer 30 is directly proportional to the number of input frames. Subsequent layers of the network typically comprise some form of pooling, for example, the MaxPool layer 32 and so the resources required to execute downstream convolutional layers such as layer 34, which in any case have only one input, are much reduced by comparison to the layer 30.

In implementations where the intervals K1 . . . K4 between the exemplary 5 frames N . . . N-4 are maintained constant to provide a sliding window of previous frames which are to be used in conjunction with a given frame N to detect movement, then the execution of the first convolutional layer 30 needs to be re-computed for every given frame N.

In embodiments of the present invention, the interval K1 between a given frame N and frame N-1 is allowed to vary over the course of a number of frames (typically similar to the number of frames being used).

This allows a convolution 30-1 of frames N-1 to N-4 to be computed once for a given set of frames with the result being temporarily stored for use in a number of subsequent frames.

Once this number of current frames have been completed, the frames being used for N-1 . . . N-4 are advanced, the convolution 30-1 re-computed and stored and this is re-used for a number of subsequent frames.

So referring to the worked example of FIG. 4, at the beginning of a cycle in which a non-uniform interval is being used between previous frames, for a frame number N=87, previous frames 66, 74, 82 and 86 are chosen as frames N-1 . . . N-4 respectively. So providing intervals varying between K1=1, K2=4 and K3, K4=8. Convolution 30-1 is performed for frames 66, 74, 82 and 86 and the result stored. As will be seen this result can then be re-used for frames N=88 . . . N=90. Thereafter, frames 74, 82, 86 and 90 are chosen as frames N-1 . . . N-4 respectively to be used with frames 91 to 94 and the process repeats again.

It will be appreciated that the set of intervals K1 . . . K4 can be varied according to the speed of moving object(s) being tracked at any given time. So if only one or more fast moving objects were being tracked K2 . . . K4 might be small and K1 might vary over the smallest range of {1 . . . 4}. On the other hand if only one or more slowly moving objects were being tracked, then K2 . . . K4 would be larger and K1 in turn might be set to vary over a greater range, say {4 . . . 7}.

Clearly, it will be appreciated that using this technique, the optimal time to change the values and ranges for K1 . . . K4 is at the beginning of a cycle when the convolution 30-1 is to be performed.

Referring back to FIG. 3, typically a single convolution 30-2 is performed on the current input frame N before the results are combined either through addition or aggregation with the results of the convolution 30-1. Thereafter, processing can continue as normal for example, with further convolutional layer 30-3, followed by an activation function 30-4 such as ReLu, the pooling layer 32 and then one or more convolutional layers such as layer 34.

Note that the layers, number of layers and layer configuration shown in FIG. 3 is purely for exemplary purposes and in variations of the embodiment, different convolutions, activation functions and pooling and combinations of such layers can be employed.

As indicated by the block 33, processing by these layers is image wide and in one embodiment, image wide processing of an intermediate image 37 provided by the first layers 30 . . . 34 of the network can conditionally continue through a first branch of further convolutional layers 36-1 . . . 36-N to provide a map 40 identifying individual locations of movement within the image.

In one embodiment, whether or not to proceed with executing these layers 36-1 . . . 36-N can be determined with an appendix network 38. This network is designed to quickly produce a rough classification of whether or not movement is present within the image. As such, the network may comprise a limited number of convolutional layers, possibly followed by one or more fully connected layers to produce the required classification for the image. (This can be a binary movement/no movement classification or a real valued classification which can be compared against a threshold.) If a positive classification for movement is determined by the network 38, the more computationally expensive layers 36-1 . . . 36(N) can be executed to produce the map 40.

The appendix network 38 can also be configured to divide the intermediate image 37 into an array of sub-regions 43. In this example, the image is divided into 3×3 sub-regions, but any number of sub-regions can be employed and indeed the division does not need to be uniform.

For each sub-region, the appendix network 38 also provides a measure of movement within the sub-region. If movement within the image is localized to one or more specific sub-regions, the appendix network 38 should produce higher than average results for those sub-regions.

Because of the pooling performed by, for example, layer 32 within the first layers 30 . . . 34 of the network, the intermediate image 37 which is processed by the appendix network 38 essentially comprises a lower resolution version of the original low resolution images 16 fed to the localizer 18 with the output of the appendix network 38 being fed back to the localizer 18 to determine whether it should continue processing an image or sub-region(s) of an image. Referring to FIG. 1, this lowest resolution image source does not necessarily have to be provided by the first layers 30 . . . 34 of the network and in variants of the above embodiment, could in fact come from an image source 37' separate from the image sources 12, 14. So for example, if image source 12 is a visible camera and image source 14 a thermal camera, image source 37' could be an event camera with a field of view similar to the cameras 12, 14 rather than a processed version of the low resolution images 16.

Thus, in the illustrated example, for each sub-region for which the appendix network 38 indicates a higher than average (or higher than a threshold) level of movement, the image information can be first de-convoluted through a dilated convolutional layer 42 to produce an image of the same size as would normally be processed by layers 36(N-p) . . . 36(N). The output of this layer 42 can pass through an activation layer 44 before being passed through layers 36(N-p) . . . 36(N) to produce a movement map 46 for the region. This map can then be interpolated or downsized and used in place of the corresponding portion of the map 40 which would have been produced by analyzing the complete image through branch 36-1 . . . 36-N.

Alternatively, the sub-region of the intermediate image 37 could be fed through layers 36-1 . . . 36-N to produce a smaller map 40 only pertaining to that active region.

The layers 42, 44, 36(N-p) . . . 36(N) can process any further sub-regions of the image in which movement is detected by the appendix network 38 to complete the map 40.

The map 40 can comprise a dense map of probability values for each location between 0 and 1 indicating the level of movement detected at a corresponding location of the image frame N. Note that the resolution of the map 40 does not need to be the same as for the input image N and one map pixel may correspond with a×b pixels of the input image N, where a, b>1.

Standard region growing techniques can then be applied to group regions of movement locations together and while such regions 20-1 . . . 20-3 are indicated in FIG. 3 as being rectangular and normal to the image axes, this does not need to be the case at this stage, and the regions can be normalized later in the process prior to classification as required.

Alternatively, the network can be configured to provide the output map 40 in the form of a grid, where each grid point encodes a bounding box located there (width & height of the bounding box, x,y offset related to the grid point) along with an indication of whether the bounding box contains an object of interest, for example, as disclosed at https://www.jeremyjordan.me/object-detection-one-stage/.

Using the approach of FIG. 3, a new movement map 40 and the extraction of locations of movement 20-1 . . . 20-3 from the map need only be completed for image frames in which some movement is sensed or expected. Furthermore, this need only be done for regions of the image in which some movement is sensed or expected and in that case the processing effectively zooms in on active regions to produce a refined movement map, expending processing power only on regions of the image likely to include moving objects.

This improves detection performance when moving objects are only in a part of the image produced by the image source 14 using the same number of operations to process an active part of an image at effectively a higher resolution.

It will be appreciated that this hybrid object detection/classification workflow can classify small/uncertain objects in an independent flow at higher resolution than used for detection. Classification is therefore able to produce confident results on long range objects by comparison to using a single image source which would either involve excessive resources or provide inaccurate results. Classification need only be performed once for each tracked object, so reducing the processing required for locating and tracking any given object while it is active.

At any given time, the system is able to track both known and unknown types of objects and classification can be extended at any time to cover further object classes, without the need for retraining the entire system.

The invention claimed is:

1. An image processing system configured to receive a first stream of images at a first resolution from a first image source (12) with a field of view of an environment and a second stream of images (16) at a second resolution lower than said first resolution from a second image source (14) with substantially the same field of view as said first image source, the second image source providing a delta image of moving objects within the field of view, wherein the first image source comprises a distinct image source separate from the second image source, said system comprising:

a localizer (18) component configured to provide a location (20) for the moving objects independently of class within successive images of said second stream of images wherein an interval between frames of the second stream of images is increased or decreased in accordance with a speed of the moving objects once the moving objects are detected;

a classifier (26) configured to: receive one or more locations selectively provided by said localizer, identify a corresponding portion of an image (17-N) acquired from said first stream at substantially the same time at which an image from said second stream in which an object of interest was identified and return a classification for a type of object within said identified portion of said image from said first stream; and a tracker (22) configured to associate said classification with said location through acquisition of successive images in said second stream.

2. The image processing system of claim 1 wherein said localizer is configured to identify temporal movement of an object over a number of images of said second stream based on generic object spatial features.

3. The image processing system of claim 1 wherein said tracker is configured either:
to provide a location to said classifier for an object newly located in an image of said second stream; or
only to provide a location to said classifier for an object which has been identified to have stopped moving within the field of view of the second image source.

4. The image processing system of claim 1 wherein said tracker is responsive to said classifier failing to classify an object, either:
to provide said object location to said classifier in response to locating said object in a subsequent image of said second stream with a higher level of confidence; or
to provide said object location to said classifier in response to locating said object with a larger size in a subsequent image of said second stream.

5. The image processing system of claim 1 wherein said classifier is configured to vary the class of object it attempts to identify at a portion of an image acquired from said first stream from time to time.

6. The image processing system of claim 1 wherein the second stream comprises a sub-sampled version of the first stream.

7. The image processing system of claim 1 wherein the second image source comprises one of: a thermal infra-red camera; a near infra-red camera; a LIDAR transceiver; an ultrasound transceiver; or an event camera.

8. A static security camera comprising the image processing system of claim 1, said first image source and said second image source integrated within a common housing.

9. The image processing system according to claim 1 wherein said localizer is adapted to receive inputs from a plurality of previously acquired images of said second stream when analyzing a given image of said second stream.

10. The image processing system according to claim 9 wherein an interval (K1-K4) between successive pairs of said plurality of previously acquired images and said given image is relatively short when tracking objects detected as moving quickly across the field of view of the environment, and said interval is relatively longer when tracking objects detected as moving slowly across the field of view of the environment.

11. The image processing system according to claim 9 wherein said localizer comprises a neural network comprising a plurality of layers configured to produce a map of movement locations for said given image.

12. The image processing system according to claim 11 wherein a first plurality of said layers comprise convolutional layers (30, 34) and wherein said network comprises a plurality of appendix layers (38) connected to the output of said first plurality of layers and configured to produce an indication (43) of whether movement may be present within said given image, said localizer being responsive to detection of movement to execute a second plurality of layers (36) of said network following said first plurality of layers to produce said map.

13. The image processing system according to claim 12 wherein said appendix layers are configured to produce an indication of whether movement may be present within one or more sub-regions (43) of said given image, said localizer being responsive to detection of movement in a sub-region to execute a further plurality of layers (42, 44) of said network on an output of said first plurality of layers to produce said map for said sub-region.

14. The image processing system according to claim 13 wherein said further plurality of layers comprises said second plurality of layers operating on a dilated output of said first plurality of layers.

15. The image processing system of claim 11 wherein a first plurality of said layers comprise convolutional layers (30, 34) and wherein a first convolutional layer (30-1) of said first plurality of layers comprises a convolution of said plurality of previously acquired images and wherein the results of said convolution are employed by said localizer for processing a limited number of successive images in said second stream.

16. A computer program product comprising a non-transitory computer readable medium on which computer readable instructions for the image processing system of claim 1 are stored, said instructions comprising a neural network configuration and weight information for at least said localizer.

* * * * *